March 23, 1943. R. E. SCHAAD 2,314,460
TREATMENT OF HYDROCARBONS
Original Filed March 29, 1939
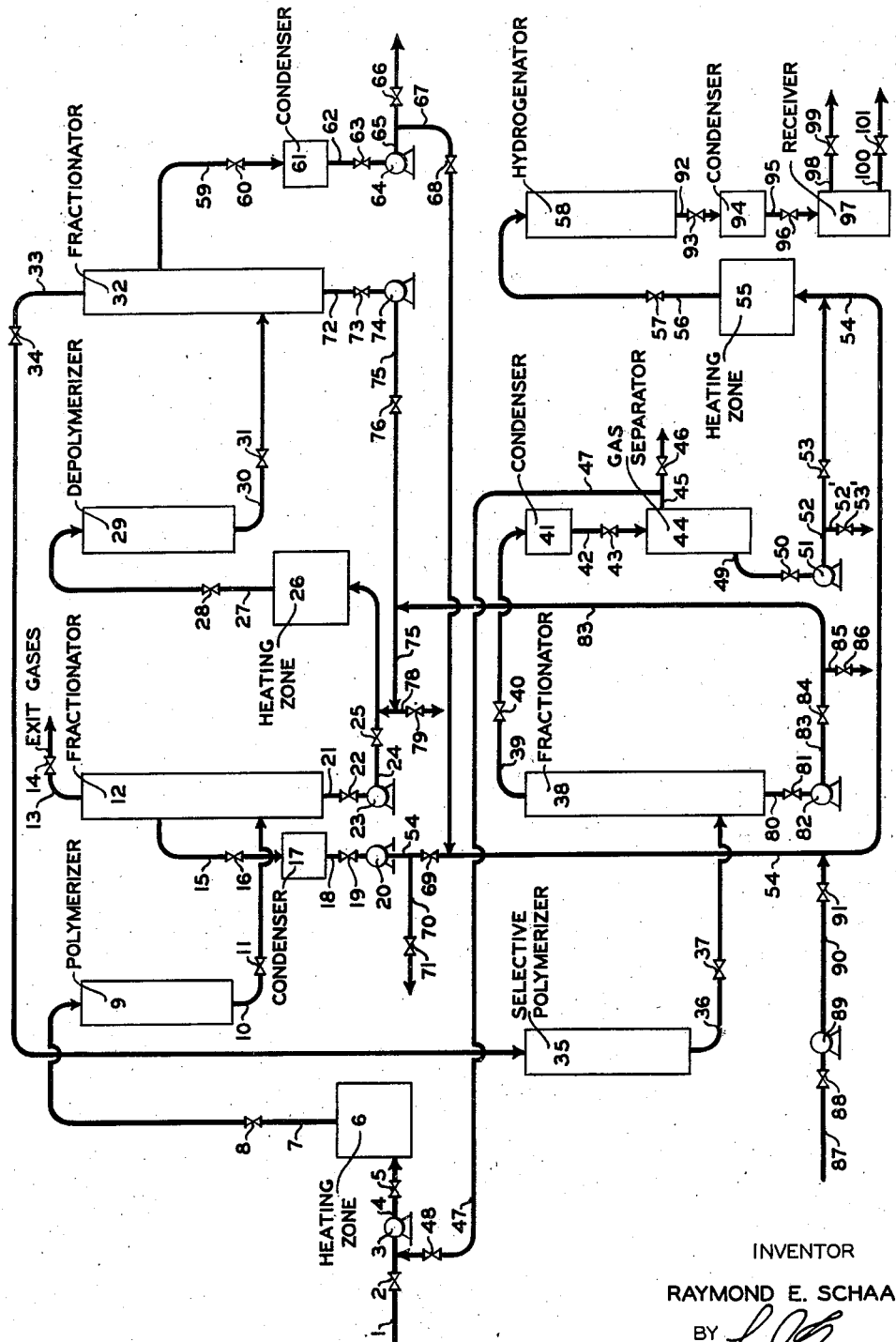
INVENTOR
RAYMOND E. SCHAAD
BY *Lee J Gary*
ATTORNEY Patented Mar. 23, 1943

2,314,460

UNITED STATES PATENT OFFICE 2,314,460

TREATMENT OF HYDROCARBONS

Raymond E. Schaad, Chicago, Ill., assignor to Universal Oil Products Company, Chicago, Ill., a corporation of Delaware Application March 29, 1939, Serial No. 264,786
Renewed July 3, 1940

15 Claims. (Cl. 196—10)

This invention relates to the manufacture of hydrocarbon mixtures suitable for use as aviation motor fuel.

More specifically it is concerned with a process involving a succession of closely cooperating steps whereby high octane number aviation motor fuel is produced from the normally gaseous olefin content of hydrocarbon fractions commonly known to the oil industry as stabilizer refluxes. These fractions are producible from hydrocarbon mixtures evolved as vapors in the stabilization of primary cracked distillates. The process is also applicable to mixtures of 3- and 4-carbon atom hydrocarbons containing varying percentages of olefins produced in any other manner, such as by dehydrogenation of the corresponding paraffins.

In one specific embodiment the present invention comprises a process for producing aviation motor fuel involving the following closely cooperating steps: (1) Polymerizing essentially normally gaseous olefins in contact with a solid phosphoric acid-containing catalyst at a temperature in the approximate range of 400-550° F. under a pressure of the order of 100-600 pounds per square inch; (2) separating substantially 6-carbon atom hydrocarbons from higher boiling polymers; (3) subjecting said higher boiling polymers to depolymerization in contact with another portion of said solid phosphoric acid-containing catalyst at a temperature in the approximate range of 450-700° F. under substantially atmospheric pressure whereby to produce substantial yields of 6-carbon atom hydrocarbons and a fraction containing 3-, 4-, and 5-carbon atom olefins; (4) subjecting said fraction containing 3-, 4-, and 5-carbon atom olefins to contact with a third portion of said phosphoric acid-containing catalyst at a temperature in the approximate range of 250-400° F. under a pressure in the order of 500-700 pounds per square inch whereby to form interpolymers; (5) fractionating said interpolymers to separate liquid products boiling below approximately 300° F. from higher boiling products which are recycled to further depolymerization treatment in step 3; and (6) hydrogenating the composite of 6-carbon atom hydrocarbons from steps 2 and 3 and of said polymer fraction from step 5 boiling below approximately 300° F. whereby to produce aviation motor fuel of high octane number.

The materials preferred as catalysts for effecting polymerization and depolymerization reactions, according to the process of this invention, consist of granular phosphoric acid-containing materials produced by calcining a mixture of an acid of phosphorus and a siliceous adsorbent. Such phosphoric acid-containing materials, as described more completely in United States Patent No. 1,993,513 and others, may be made by the successive steps of (1) mixing a phosphoric acid with a finely divided and relatively inert, generally siliceous, carrying material, such as, for example, kieselguhr to form a rather wet paste (the acid ordinarily being in major proportion by weight); (2) calcining at temperatures of the order of 752-932° F., to produce a solid cake; (3) grinding and sizing to produce particles of usable mesh; and (4) rehydrating the catalyst granules at temperatures of the order of 510° F. to produce an acid composition corresponding to optimum polymerizing activity. This procedure may be varied by forming particles from the original paste by extrusion or pelleting methods and following with the calcining and rehydrating steps. In the reactions taking place during calcining it is evident that some of the acid is "fixed" on the carrier and that some meta-phosphoric acid, which is substantially without polymerizing activity, is formed. The rehydrating step evidently produces an acid composition corresponding closely to the pyro-acid having a formula $H_4P_2O_7$ and corresponding to the double oxide formula $P_2O_5.2H_2O$.

The solid phosphoric acid catalysts preferred for use in the present invention are characterized by the fact that they are precalcined before use both to fix the composition of the acid and to form particles of a granular structure capable of withstanding the conditions of service to which they are subjected. When these catalysts become coated with carbonaceous deposits they can be reactivated by oxidation with air, or with gas mixtures of controlled oxygen concentration at temperatures of the approximate order of 800-1000° F., followed by contacting with superheated steam at a temperature in the approximate range of 450-550° F., under atmospheric pressure to rehydrate the acid to the most desirable composition. Rehydration at higher temperatures may be made under steam pressures corresponding to approximately the water vapor pressure of the catalyst at the operating temperature.

For the hydrogenation step of the process of this invention any type of hydrogenating catalyst may be used, such as nickel oxide, or more active varieties may be employed as reduced nickel on a siliceous carrier. Nickel oxide used for this purpose undergoes partial reduction under the conditions of operation so that the effective catalyst consists of a substantial proportion of reduced nickel. A convenient method of producing an active nickel catalyst supported by a siliceous carrier is by precipitating nickel carbonate on diatomaceous earth, drying, calcining and pelleting the mixed powder, and then reducing the pellets with hydrogen at a temperature of approximately 750° F. Alternatively, less active catalysts may be employed, such as the oxides of chromium, molybdenum, and tungsten, but in such cases temperature, pressure, and time of contact will need to be altered to obtain the desired hydrogenation.

The olefinic content of essentially 3- and 4-carbon atom hydrocarbon fractions may be polymerized in contact with a solid phosphoric acid-containing catalyst at a temperature in the approximate range of 400–550° F. under a pressure of approximately 100–600 pounds per square inch. Such gases, normally known as "stabilizer refluxes," containing relatively high proportions of propene and n-butenes but relatively small proportions of isobutene react under the conditions in the indicated ranges and give polymers of approximately 80–82 octane number which, on hydrogenation, yield saturated fractions of lower octane number in the approximate order of 65–70. It is the object of this invention to produce saturated aviation gasoline of 85–90 or higher octane number from essentially the same type of gaseous charging stock by a combination of other features to be described subsequently.

The character and steps of the process of the present invention will be amplified by describing a typical operation in connection with the attached drawing which shows diagrammatically, by the use of conventional figures, in general side elevation an arrangement of equipment in which the object of the invention may be accomplished. The units and connections shown in the drawing are not to any exact or relative scale and are not intended to limit the scope of the invention.

Referring to the drawing, line 1, containing valve 2, is provided for the introduction of essentially 3- and/or 4-carbon atom hydrocarbon fractions containing propene and/or butenes to charging pump 3 which discharges through line 4, containing valve 5, to heating zone 6 from which the heated gases pass through line 7, containing valve 8, to the top of polymerizer 9 in which the catalyst temperature is of the order of 400–550° F. and the pressure of the approximate order of 100–600 pounds per square inch. Polymers and unconverted 3- and 4-carbon atom hydrocarbons are conducted through line 10, containing valve 11, to a fractionator 12, of conventional design which may comprise a stabilizer and a fractional distillation column. Unconverted 3- and 4-carbon atom hydrocarbons comprising mainly propane and butanes are released continuously from fractionator 12 through line 13, containing valve 14. From fractionator 12 a cut comprising essentially 6-carbon atom hydrocarbons may be withdrawn through line 15, containing valve 16, and passed through a condenser 17 wherein these hydrocarbons are liquefied and thence passed through line 18, containing valve 19, to pump 20 used for charging these with other products to a heater and hydrogenator to be described subsequently.

Polymer products boiling higher than hexenes and hexanes are withdrawn from fractionator 12 through line 21, containing valve 22, by pump 23 and discharge through line 24 and valve 25 into a heating zone 26 where polymers are heated to a temperature in the approximate range of 450–700° F. and are conducted thence through line 27, containing valve 28, and discharged into depolymerizer 29 containing a granular phosphoric acid-containing catalyst and operated under substantially atmospheric pressure. After a contact time in the depolymerizer generally in the order of 2–40 seconds, the products are withdrawn from the bottom of the depolymerizer through line 30, containing valve 31, and conducted to fractionator 32, which may comprise a stabilizer and a distillation column operated so that 3-, 4-, and 5-carbon atom hydrocarbons may be separated from the higher boiling products. These 3-, 4-, and 5-carbon atom hydrocarbons are conducted from fractionator 32 through line 33, containing valve 34, to the top of selective polymerizer 35, containing granular phosphoric acid catalyst maintained at a temperature in the approximate range of 250–400° F. under a pressure in the order of 500–700 pounds per square inch. Under these conditions of operation the 3-, 4-, and 5-carbon atom olefins undergoing interpolymerization producing mono-olefins, a relatively high proportion of which are hydrogenatable to a saturated aviation gasoline boiling range fraction of high anti-knock value.

The polymers and unconverted hydrocarbons from selective polymerizer 35 are released through line 36, containing valve 37, and passed to fractionator 38 operated in the conventional manner so that the dissolved gaseous hydrocarbons and a fraction of the desired boiling range may be withdrawn from the top of the fractionator through line 39, containing valve 40, and passed through condenser 41, thence through rundown line 42, containing valve 43, to gas separator 44 equipped with a conventional gas release line 45, containing valve 46. If desired, the gas, or a portion thereof, withdrawn through line 45 comprising mainly 3- and 4-carbon atom hydrocarbons may be passed through recycle line 47, containing valve 48, to line 1 where it is commingled with the fresh charging stock being introduced in the first step of the process.

Polymer distillate of the desired boiling range, preferably that of aviation gasoline, accumulates in gas separator 44 from which it is withdrawn through line 49, containing valve 50, to pump 51 discharging through line 52, containing valve 53, into header 54 which next passes to heating zone 55 and thence through line 56, containing valve 57, to hydrogenator 58. A portion of the polymer distillate being discharged by pump 51 into line 52 may be released therefrom through branch line 52′, containing valve 53′, and passed to storage.

A fraction comprising essentially 6-carbon atom hydrocarbons may be withdrawn from fractionator 32 through line 59, containing valve 60, and passed through condenser 61 and rundown line 62, containing valve 63, to pump 64 discharging alternatively through line 65, containing valve 66, and to storage; or through line 67 and valve 68 to header 54, already mentioned, which communicates with hydrogenator 58.

A fraction comprising essentially 6-carbon atom hydrocarbons, separated in fractionator 12 and withdrawn through lines 15 and 18 to pump 20, is passed thence into header 54, containing valve 69, and then to heating zone 55 and hydrogenator 58. If desired, all or a part of this fraction charged by pump 20 into header 54 may be released through branch line 70, containing valve 71 and conducted to storage.

Relatively high boiling products formed in the depolymerization step may be withdrawn from fractionator 32 through line 72, containing valve 73, by pump 74 discharging through line 75 and valve 76 into line 24, already mentioned, wherein it is commingled with polymers being passed to depolymerizer 29. A portion of the hydrocarbons being recycled through line 75 may be withdrawn therefrom by way of branch line 78, containing valve 79.

A relatively high boiling fraction of selective polymers may be withdrawn from fractionator 38 through line 80, containing valve 81 by pump 82 discharging through line 83 and valve 84 to line 75, already mentioned, in which it is commingled with another high boiling fraction withdrawn from fractionator 32, as already described. A portion of the product being recirculated to depolymerizer 29 by way of line 83 may be withdrawn through branch line 85 and valve 86 and conducted to storage.

The 6-carbon atom hydrocarbons obtained in the polymerization step in polymerizer 9 and in the depolymerization by means of depolymerizer 29, and the polymer distillate (preferably of aviation end point) obtained as overhead from fractionator 38 are mixed in header 54 as already mentioned. Hydrogen from an outside source is admitted through line 87, containing valve 88 to compressor 89 discharging through line 90 and valve 91 into header 54 where it mixes with the hydrocarbons therein contained. From header 54 the mixture of hydrogen and hydrocarbons passes through heating zone 55 and line 56, containing valve 57, to hydrogenator 58 in which the mixture is contacted with a hydrogenation catalyst preferably at a temperature in the approximate range of 250–500° F. under a pressure of the order of 25–100 pounds per square inch. The hydrogenated products are released from hydrogenator 58 through line 92 containing valve 93, condensed by condenser 94 and passed therefrom through line 95, containing valve 96, to receiver 97 equipped with a conventional gas release line 98, containing valve 99. From receiver 97 the hydrogenated product may be withdrawn through line 100, containing valve 101, and thence conducted to storage.

The following example is given to indicate some of the results normally obtainable in the operation of the process, although not with the intention of correspondingly limiting the scope of the invention.

A stabilizer reflux, having the composition shown below, was charged to a plant operating with the process flow indicated in the attached diagrammatic drawing:

|  | Mole per cent |
|---|---|
| Propene | 12.6 |
| Propane | 28.0 |
| Isobutene | 3.0 |
| n-Butenes | 10.4 |
| Butanes | 46.0 |

This charging stock was passed through a tower containing solid phosphoric acid catalyst at 475° F. under a pressure of 500 pounds per square inch. The total polymerization of the olefins was 75% and the production of liquid polymers was 4.4 gallons per thousand cubic feet of gas charged. This polymer yield consisted of 0.5 gallon of 6-carbon atom hydrocarbons and 3.9 gallons of higher boiling polymers. The latter material was subjected to depolymerization at a temperature of 572° F. under atmospheric pressure, using a charging rate corresponding to a liquid space velocity of 0.4 and an approximate contact time of 18 seconds. By this treatment the polymer from the first step underwent 33% conversion into 6-carbon atom and lighter hydrocarbons. By recycling the higher boiling unconverted material, further conversion into low molecular olefinic products was effected. Using a recycle ratio of 4 this depolymerization step yielded 44% by weight of condensable gases, 25% by weight of 6-carbon atom hydrocarbons, and 15% by weight of higher boiling liquids, the remaining 16% being non-condensable gases and mechanical loss. The fraction containing 6-carbon atom hydrocarbons formed in this depolymerization was equivalent to 1.0 gallon per thousand cubic feet of stabilizer reflux charged originally.

The condensable gases formed by the depolymerization indicated above, had the molar composition shown in the following table:

|  | Per cent |
|---|---|
| Propene | 3.7 |
| Propane | 1.7 |
| Isobutene | 23.4 |
| n-Butenes | 49.8 |
| Butanes | 4.3 |
| Pentenes and pentanes | 17.1 |

This hydrocarbon mixture containing 90% of olefins was next contacted with solid phosphoric acid catalyst at 325° F. under a pressure of 550 pounds per square inch. By this treatment 92% polymerization occurred and a polymer fraction of 300° F. end point was produced corresponding to 1.5 gallons per thousand cubic feet of stabilizer reflux originally charged. The composite of this 300° F. end point fraction and the 6-carbon atom fractions, produced as indicated above, was catalytically hydrogenated to produce 3.0 gallons of 85 octane number aviation gasoline fraction per thousand cubic feet of stabilizer reflux charged.

The nature of the process of the present invention and its practical application are evident from the preceding specification and illustrative data presented, although neither section is intended to unduly limit its generally broad scope.

I claim as my invention:

1. A continuous process for producing aviation motor fuel comprising contacting normally gaseous olefins with a solid phosphoric acid-containing catalyst under conditions adequate to effect polymer formation; separating from said polymer formation substantialy 6-carbon atom hydrocarbons and higher boiling material; subjecting said higher boiling material to contact with a solid phosphoric acid-containing catalyst under depolymerization conditions of temperature and pressure to form products containing lower boiling hydrocarbons; fractionating said products to separate therefrom a fraction containing 3-, 4-, and 5-carbon atom olefins, a 6-carbon atom hydrocarbon fraction and higher boiling recycle stock for depolymerization; subjecting said fraction containing 3-, 4-, and 5-carbon atom olefins to contact with a solid phosphoric acid-containing catalyst to form interpolymers; fractionating said interpolymers to separate a fraction of 300° F. end point from the higher boiling products which are recycled to further depolymerization; and hydrogenating the composite 300° F. end point fraction and the 6-carbon atom hydrocarbon fractions to produce aviation motor fuel of high octane number.

2. A continuous process for producing aviation motor fuel comprising contacting gases containing normally gaseous olefins with a solid phosphoric acid-containing catalyst at a temperature of the approximate order of 400–550° F. under a pressure in the approximate range of 100–600 pounds per square inch to effect polymer formation; separating from said polymer formation substantially 6-carbon atom hydrocarbons and higher boiling material; subjecting said higher boiling material to contact with a solid phosphoric acid-containing catalyst under depolymerization conditions of temperature and pressure to form products containing lower boiling hydrocarbons; fractionating said products to separate therefrom a fraction containing 3-, 4-, and 5-carbon atom olefins, a 6-carbon atom hydrocarbon fraction and higher boiling recycle stock for depolymerization; subjecting said fraction containing 3-, 4-, and 5-carbon atom olefins to contact with a solid phosphoric acid-containing catalyst to form interpolymers; fractionating said interpolymers to separate a fraction of 300° F. end point from the higher boiling products which are recycled to further depolymerization; and hydrogenating the composited 300° F. end point fraction and the 6-carbon atom hydrocarbon fractions to produce aviation motor fuel of high octane number.

3. A continuous process for producing aviation motor fuel comprising contacting normally gaseous olefins with a solid phosphoric acid-containing catalyst at a temperature of the approximate order of 400–550° F. under a pressure in the approximate range of 100–600 pounds per square inch to effect polymer formation; separating from said polymer formation substantially 6-carbon atom hydrocarbons and higher boiling material; subjecting said higher boiling material to contact with a solid phosphoric acid-containing catalyst at a temperature in the approximate range of 450–700° F. under substantially atmospheric pressure to form products containing lower boiling hydrocarbons; fractionating said products to separate therefrom a fraction containing 3-, 4-, and 5-carbon atom olefins, a 6-carbon atom hydrocarbon fraction and higher boiling recycle stock for depolymerization; subjecting said fraction containing 3-, 4-, and 5-carbon atom olefins to contact with a solid phosphoric acid-containing catalyst to form interpolymers; fractionating said interpolymers to separate a fraction of 300° F. end point from the higher boiling products which are recycled to further depolymerization; and hydrogenating the composited 300° F. end point fraction and the 6-carbon atom hydrocarbon fractions to produce aviation motor fuel of high octane number.

4. A continuous process for producing aviation motor fuel comprising contacting gases containing normally gaseous olefins with a solid phosphoric acid-containing catalyst at a temperature of the approximate order of 400–550° F. under a pressure in the approximate range of 100–600 pounds per square inch to effect polymer formation; separating from said polymer formation substantially 6-carbon atom hydrocarbons and higher boiling material; subjecting said higher boiling material to contact with a solid phosphoric acid-containnig catalyst at a temperature in the approximate range of 450–700° F. under substantially atmospheric pressure to form products containing lower boiling hydrocarbons; fractionating said products to separate therefrom a fraction containing 3-, 4-, and 5-carbon atom olefins, a 6-carbon atom hydrocarbon fraction and higher boiling recycle stock for depolymerization; subjecting said fraction containing 3-, 4-, and 5-carbon atom olefins to contact with a solid phosphoric acid-containing catalyst at a temperature in the approximate range of 250–400° F. under a pressure in the order of 500–700 pounds per square inch to form interpolymers; fractionating said interpolymers to separate a fraction of 300° F. end point from the higher boiling products which are recycled to further depolymerization; and hydrogenating the composited 300° F. end point fraction and the 6-carbon atom hydrocarbon fractions to produce aviation motor fuel of high octane number.

5. A continuous process for producing aviation motor fuel comprising contacting normally gaseous olefins with a granular precalcined mixture of an acid of phosphorus and a generally siliceous adsorbent at a temperature of the approximate order of 400–550° F. under a pressure in the approximate range of 100–600 pounds per square inch to effect polymer formation; separating from said polymer formation substantially 6-carbon atom hydrocarbons and higher boiling material; subjecting said higher boiling material to contact with a granular precalcined mixture of an acid of phosphorus and a generally siliceous adsorbent at a temperature in the approximate range of 450–700° F. under substantially atmospheric pressure to form products containing lower boiling hydrocarbons; fractionating said products to separate therefrom a fraction containing 3-, 4-, and 5-carbon atom olefins, a 6-carbon atom hydrocarbon fraction and higher boiling recycle stock for depolymerization; subjecting said fraction containing 3-, 4-, and 5-carbon atom olefins to contact with a granular precalcined mixture of an acid of phosphorus and a generally siliceous adsorbent at a temperature in the approximate range of 250–400° F. under a pressure in the order of 500–700 pounds per square inch to form interpolymers; fractionating said interpolymers to separate a fraction of 300° F. end point from the higher boiling products which are recycled to further depolymerization; and hydrogenating the composited 300° F. end point fraction and the 6-carbon atom hydrocarbon fractions to produce aviation motor fuel of high octane number.

6. A continuous process for producing aviation motor fuel comprising contacting normally gaseous olefins with a granular precalcined mixture of pyro-phosphoric acid and a generally siliceous adsorbent at a temperature of the approximate order of 400–550° F. under a pressure in the approximate range of 100–600 pounds per square inch to effect polymer formation; separating from said polymer formation substantially 6-carbon atom hydrocarbons and higher boiling material; subjecting said higher boiling material to contact with a granular precalcined mixture of pyro-phosphoric acid and a generally siliceous adsorbent at a temperature in the approximate range of 450–700° F. under substantially atmospheric pressure to form products containing lower boiling hydrocarbons; fractionating said products to separate therefrom a fraction containing 3-, 4-, and 5-carbon atom olefins, a 6-carbon atom hydrocarbon fraction and higher boiling recycle stock for depolymerization; subjecting said fraction containing 3-, 4-, and 5-carbon atom olefins to contact with a granular precalcined mixture of pyro-phosphoric acid and a generally siliceous adsorbent at a temperature in the approximate range of 250–400° F. under a pressure in the order of 500–700 pounds per square inch to form interpolymers; fractionating said interpolymers to separate a fraction of 300° F. end point from the higher boiling products which are recycled to further depolymerization; and hydrogenating the composited 300° F. end point fraction and the 6-carbon atom hydrocarbon fractions to produce aviation motor fuel of high octane number.

7. A continuous process for producing aviation motor fuel comprising contacting gases containing normally gaseous olefins with a granular precalcined mixture of pyro-phosphoric acid and diatomaceous earth at a temperature of the approximate order of 400–550° F. under a pressure in the approximate range of 100–600 pounds per square inch to effect polymer formation; separating from said polymer formation substantially 6-carbon atom hydrocarbons and higher boiling material; subjecting said higher boiling material to contact with a granular precalcined mixture of pyro-phosphoric acid and diatomaceous earth at a temperature in the approximate range of 450–700° F. under substantially atmospheric pressure whereby to form products containing lower boiling hydrocarbons; fractionating said products to separate therefrom a fraction containing 3-, 4-, and 5-carbon atom olefins, a 6-carbon atom hydrocarbon fraction and higher boiling recycle stock for depolymerization; subjecting said fraction containing 3-, 4-, and 5-carbon atom olefins to contact with a granular precalcined mixture of pyro-phosphoric acid and diatomaceous earth at a temperature in the approximate range of 250–400° F. under a pressure in the order of 500–700 pounds per square inch to form interpolymers; fractionating said interpolymers to separate a fraction of 300° F. end point from the higher boiling products which are recycled to further depolymerization; and hydrogenating the composited 300° F. end point fraction and the 6-carbon atom hydrocarbon fractions to produce aviation motor fuel of high octane number.

8. A continuous process for producing aviation motor fuel comprising contacting gases containing normally gaseous olefins with a granular precalcined mixture of pyrophosphoric acid and diatomaceous earth at a temperature of the approximate order of 400–550° F. under a pressure in the approximate range of 100–600 pounds per square inch to effect polymer formation; separating from said polymer formation substantially 6-carbon atom hydrocarbons and higher boiling material; subjecting said higher boiling material to contact with a granular precalcined mixture of pyro-phosphoric acid and diatomaceous earth at a temperature in the approximate range of 450–700° F. under substantially atmospheric pressure to form products containing lower boiling hydrocarbons; fractionating said products to separate therefrom a fraction containing 3-, 4-, and 5-carbon atom olefins, a 6-carbon atom hydrocarbon fraction and higher boiling recycle stock for depolymerization; subjecting said fraction containing 3-, 4-, and 5-carbon atom olefins to contact with a granular precalcined mixture of pyro-phosphoric acid and diatomaceous earth at a temperature in the approximate range of 250–400° F. under a pressure in the order of 500–700 pounds per square inch to form interpolymers; fractionating said interpolymers to separate a fraction of 300° F. end point from the higher boiling products which are recycled to further depolymerization; and hydrogenating the composited 300° F. end point fraction and the 6-carbon atom hydrocarbon fractions in the presence of a hydrogenation catalyst at a temperature in the approximate range of 250–500° F. under a pressure of the approximate order of 25–100 pounds per square inch to produce aviation motor fuel of high octane number.

9. A continuous process for producing aviation motor fuel comprising contacting gases containing propene with a granular precalcined mixture of pyro-phosphoric acid and diatomaceous earth at a temperature of the approximate order of 400–550° F. under a pressure in the approximate range of 100–600 pounds per square inch to effect polymer formation; separating from said polymer formation substantially 6-carbon atom hydrocarbons and high boiling material; subjecting said higher boiling material to contact with a granular precalcined mixture of pyro-phosphoric acid and diatomaceous earth at a temperature in the approximate range of 450–700° F. under substantially atmospheric pressure to form products containing lower boiling hydrocarbons; fractionating said products to separate therefrom a fraction containing 3-, 4-, and 5-carbon atom olefins, a 6-carbon atom hydrocarbon fraction and higher boiling recycle stock for depolymerization; subjecting said fraction containing 3-, 4-, and 5-carbon atom olefins to contact with a granular precalcined mixture of pyro-phosphoric acid and diatomaceous earth at a temperature in the approximate range of 250–400° F. under a pressure in the order of 500–700 pounds per square inch to form interpolymers; fractionating said interpolymers to separate a fraction of 300° F. end point from the higher boiling products which are recycled to further depolymerization; and hydrogenating the composited 300° F. end point fraction and the 6-carbon atom hydrocarbon fractions in the presence of a hydrogenation catalyst at a temperature in the approximate range of 250–500° F. under a pressure of the approximate order of 25–100 pounds per square inch to produce aviation motor fuel of high octane number.

10. A continuous process for producing aviation motor fuel comprising contacting gases containing n-butenes with a granular precalcined mixture of pyro-phosphoric acid and diatomaceous earth at a temperature of the approximate order of 400–550° F. under a pressure in the approximate range of 100–600 pounds per square inch to effect polymer formation; separating from said polymer formation substantially 6-carbon atom hydrocarbons and higher boiling material; subjecting said higher boiling material to contact with a granular precalcined mixture of pyrophosphoric acid and diatomaceous earth at a temperature in the approximate range of 450–700° F. under substantially atmospheric pressure to form products containing lower boiling hydrocarbons; fractionating said products to separate therefrom a fraction containing 3-, 4-, and 5-carbon atom olefins, a 6-carbon atom hydrocarbon fraction and higher boiling recycle stock for depolymerization; subjecting said fraction containing 3-, 4-, and 5-carbon atom olefins to contact with a granular precalcined mixture of pyrophosphoric acid and diatomaceous earth at a temperature in the approximate range of 250–400° F. under a pressure in the order of 500–700 pounds per square inch to form interpolymers;

fractionating said interpolymers to separate a fraction of 300° F. end point from the higher boiling products which are recycled to further depolymerization; and hydrogenating the composited 300° F. end point fraction and the 6-carbon atom hydrocarbon fractions in the presence of a hydrogenation catalyst at a temperature in the approximate range of 250–500° F. under a pressure of the approximate order of 25–100 pounds per square inch to produce aviation motor fuel of high octane number.

11. A process for producing saturated hydrocarbons boiling in the gasoline range and of high anti-knock value, which comprises subjecting normally gaseous olefins to polymerization to form hydrocarbons of 6 and more carbon atoms to the molecule, separating the $C_6$ hydrocarbons from heavier polymers, depolymerizing the latter to form olefins of less than 6 carbon atoms to the molecule, subjecting the last-named olefins to interpolymerization independently of said normally gaseous olefins to form mixed olefin polymers, and subjecting at least a portion of said mixed polymers and said $C_6$ hydrocarbons to hydrogenation to effect substantial saturation thereof.

12. A process for producing saturated hydrocarbons boiling in the gasoline range and of high anti-knock value, which comprises subjecting normally gaseous olefins to polymerization to form hydrocarbons of 6 and more carbon atoms to the molecule, separating the $C_6$ hydrocarbons from heavier polymers, depolymerizing the latter to form olefins of less than 6 carbon atoms to the molecule, subjecting the last-named olefins to interpolymerization independently of said normally gaseous olefins to form mixed olefin polymers, separating from the products of the interpolymerization a fraction of approximately 300° F. end point, and subjecting said fraction and said $C_6$ hydrocarbons to hydrogenation to effect substantial saturation thereof.

13. The process as defined in claim 12 further characterized in that products of the interpolymerization boiling above approximately 300° F. are supplied to the depolymerizing step.

14. A process for producing saturated hydrocarbons boiling in the gasoline range and of high anti-knock value, which comprises subjecting normally gaseous olefins to polymerization to form hydrocarbons of 6 and more carbon atoms to the molecule, separating the $C_6$ hydrocarbons from heavier polymers, depolymerizing the latter to form olefins of less than 6 carbon atoms to the molecule and additional $C_6$ hydrocarbons, separating the olefins of less than 6 carbon atoms from said adidtional $C_6$ hydrocarbons and subjecting the same to interpolymerization, and hydrogenating resultant mixed polymers, the first-mentioned $C_6$ hydrocarbons and said additional $C_6$ hydrocarbons to effect substantial saturation thereof.

15. In the polymerization of normally gaseous olefins, wherein there are formed olefin polymers of more than 6 carbon atoms to the molecule, the method of producing saturated high anti-knock hydrocarbons boiling in the gasoline range from said polymers, which comprises depolymerizing the heavy polymers to form $C_6$ hydrocarbons and olefins of less than 6 carbon atoms to the molecule, separating the $C_6$ hydrocarbons from the lighter olefins, subjecting the latter to interpolymerization, combining resultant mixed olefin polymers with said $C_6$ hydrocarbons and hydrogenating the mixture to effect substantial saturation thereof.

RAYMOND E. SCHAAD.